US010861311B2

(12) United States Patent
Rahman et al.

(10) Patent No.: US 10,861,311 B2
(45) Date of Patent: *Dec. 8, 2020

(54) METHOD FOR MONITORING PERSONAL PROTECTION EQUIPMENT COMPLIANCE

(71) Applicant: Honeywell International Inc., Morris Plains, NJ (US)

(72) Inventors: Ataur Rahman, Hyderabad (IN); Rahul Nair, Hyderabad (IN); Siva Sathish Kumar T, Hyderabad (IN)

(73) Assignee: Honeywell International, Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,615

(22) Filed: Oct. 23, 2019

(65) Prior Publication Data

US 2020/0126387 A1  Apr. 23, 2020

Related U.S. Application Data

(63) Continuation of application No. 15/766,757, filed as application No. PCT/US2015/054907 on Oct. 9, 2015, now Pat. No. 10,535,242.

(51) Int. Cl.
*G08B 21/02* (2006.01)
*H04W 4/38* (2018.01)
*G01P 13/00* (2006.01)

(52) U.S. Cl.
CPC ............. *G08B 21/02* (2013.01); *G01P 13/00* (2013.01); *H04W 4/38* (2018.02)

(58) Field of Classification Search
CPC ........................... G06Q 10/00; G06Q 50/265
USPC ........................................ 340/573.1
See application file for complete search history.

(56) References Cited

U.S. PATENT DOCUMENTS

| | | | |
|---|---|---|---|
| 2015/0285927 A1* | 10/2015 | Nedilko | B61L 23/041 702/2 |
| 2016/0232758 A1* | 8/2016 | Fletcher | G08B 21/0247 |
| 2017/0248272 A1* | 8/2017 | Ullrich | A41D 3/00 |

* cited by examiner

*Primary Examiner* — Fabrico R Murillo Garcia
(74) *Attorney, Agent, or Firm* — Craige Thompson; Thompson Patent Law

(57) ABSTRACT

Embodiments relate generally to methods and systems for monitoring personal protection equipment (PPE) compliance. A method may comprise receiving, by a user identification (ID) module, information from sensor modules attached to PPE devices worn by the user, determining if the sensor modules indicate that the PPE devices are active or inactive, communicating the information from the user ID to a supervisor console, and displaying this information by a supervisor console. The user ID may be associated with a specific user, and the sensor modules may be associated with specific PPE devices. When it is determined that a required PPE device is inactive, corrective action may be taken by the supervisor.

20 Claims, 6 Drawing Sheets

| PPE usage report-SITE 324 | | | | | | | |
|---|---|---|---|---|---|---|---|
| | Assigned PPE | | | | | | |
| Person | Hard Hat | Goggles | Ear muff | Bib Overall | Gloves | Safety Vest | Boots |
| Robert M | ◍ | ○ | ◍ | ◍ | ◍ | ○ | ◍ |
| Richard S | ○ | ◍ | ◍ | ◍ | ◍ | ◍ | ◍ |
| Johnson K | ◍ | ◍ | ◍ | ○ | ◍ | ◍ | ○ |
| Michael T | ◍ | ◍ | ◍ | ◍ | ○ | ◍ | ◍ |
| Williams R | ◍ | ◍ | ◍ | ◍ | ◍ | ○ | ◍ |
| Dave C | ◍ | ○ | ◍ | ○ | ◍ | ◍ | ○ |

Safety supervisor dashboard

● Worn
○ Not worn
◍ Not required

*FIG. 2B*

METHOD FOR MONITORING PERSONAL PROTECTION EQUIPMENT COMPLIANCE

BACKGROUND

When a worksite may have potentially hazardous elements, such as high noise levels, hazardous materials or chemicals, or dangerous equipment, personal protection equipment (PPE) may be required for a user to enter the worksite. PPE may include ear muffs, hard hats, helmets, boots, goggles, gloves, suits, hoods, gas detectors, protective clothing, hearing protection, bibs, coveralls, safety vests, gas detectors, respiration systems, among other PPE devices. A user may be required to wear multiple PPE devices when entering a work site.

SUMMARY

Aspects of the disclosure may include embodiments of a method for monitoring personal protection equipment (PPE) compliance comprising assigning one or more PPE device to a user, wherein each of the PPE devices comprises a sensor module; assigning a personalized user identification (ID) module to a user; receiving, by the user ID module, information from the sensor module via wireless communication; determining whether the PPE device is active based on the information received from the sensor module; when the PPE device is determined to be active, sending, by the user ID, information to a supervisor console indicating PPE compliance; displaying, by the supervisor console, that the PPE status is compliant; when the PPE device is determined to be inactive, sending, by the user ID, information to the supervisor console indicating PPE noncompliance; displaying, by the supervisor console, that the PPE status is noncompliant; and taking corrective action, by the supervisor, to ensure PPE compliance.

In some embodiments, the sensor module comprises a motion sensor. In some embodiments, determining whether the PPE devices is active comprising receiving motion detection information from the sensor module. In some embodiments, the method may further comprise repeating at least part of the method for each PPE device that is worn by the user, wherein the supervisor console is operable to display information from each of the PPE devices. In some embodiments, the method may further comprise repeating the method for multiple users that are monitored by the supervisor, wherein the supervisor console is operable to display information from the multiple users. In some embodiments, the user ID module communicates with the sensor module via Bluetooth. In some embodiments, the user ID module comprises a user ID card that is worn by the user at all times while they are in the work site. In some embodiments, the method may further comprise mapping the assigned PPE devices for each worker with the user ID module for that worker and saving this information to a server. In some embodiments, the method may further comprise repeating at least part of the method when a user enters a new work site. In some embodiments, the method may further comprise attaching the sensor modules to each of the PPE devices that will be used in the work site, before the PPE devices are worn by a user. In some embodiments, the PPE devices comprise one or more of the following: ear muffs, hard hats, helmets, boots, goggles, gloves, suits, hoods, gas detectors, protective clothing, hearing protection, bibs, coveralls, safety vests, gas detectors, and respiration systems. In some embodiments, the method may further comprise processing, by the supervisor console, the information from the user ID to generate a personalized alert for the supervisor indicating noncompliance for that particular user and that particular PPE device. In some embodiments, the user ID communicates wirelessly with each sensor module that is attached to a PPE device worn by the user, wherein the user ID may receive information from all of the sensor modules.

Additional aspects of the disclosure may include embodiments of a method for monitoring PPE compliance comprising assigning one or more PPE device to a user, wherein each of the PPE devices comprises a sensor module, and wherein the sensor module comprises a motion sensor; assigning a personalized user ID module to a user; receiving, by the user ID module, information from the sensor module via wireless communication; associating, by the sensor module, the information from the sensor module with the PPE device attached to the sensor module; associating, by the user ID, the information received by the user ID module with a user identifier; determining whether the PPE device is active based on the information received from the sensor module, wherein the PPE device is determined to be active when motion is detected by the sensor module; when the PPE device is determined to be active, sending, by the user ID, information to a supervisor console indicating PPE compliance; displaying, by the supervisor console, that the PPE status is compliant, using the associated PPE device and associated user identifier to determine how to display the information; when the PPE device is determined to be inactive, sending, by the user ID, information to the supervisor console indicating PPE noncompliance; displaying, by the supervisor console, that the PPE status is noncompliant, using the associated PPE device and associated user identifier to determine how to display the information; and taking corrective action, by the supervisor, to ensure PPE compliance.

In some embodiments, the method may further comprise repeating at least part of the method for each PPE device that is worn by the user, wherein the supervisor console is operable to display information from each of the PPE devices. In some embodiments, the method may further comprise repeating the method for multiple users that are monitored by the supervisor, wherein the supervisor console is operable to display information from the multiple users.

Other aspects of the disclosure may include embodiments of a PPE compliance monitoring system comprising one or more PPE devices worn by a user; one or more sensor modules attached to the one or more PPE devices; a user ID module that is associated with the user, wherein the user ID module is operable to communicate wirelessly with the one or more sensor modules; and a supervisor console operable to receive, process, and display information from the user ID module, wherein the user ID module is operable to receive information from the one or more sensor modules; determine whether the sensor module detects that the attached PPE device is active; and communicate information to the supervisor console indicating that the PPE device is active or inactive.

In some embodiments, the supervisor console is operable to receive information from multiple users. In some embodiments, the PPE devices comprise one or more of the following: ear muffs, hard hats, helmets, boots, goggles, gloves, suits, hoods, gas detectors, protective clothing, hearing protection, bibs, coveralls, safety vests, gas detectors, and respiration systems. In some embodiments, the user ID module comprises a user ID card that is worn by the user at all times while they are in the work site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2B illustrates a detailed view of a supervisor console according to an embodiment of the disclosure;

DETAILED DESCRIPTION

Figure 1:
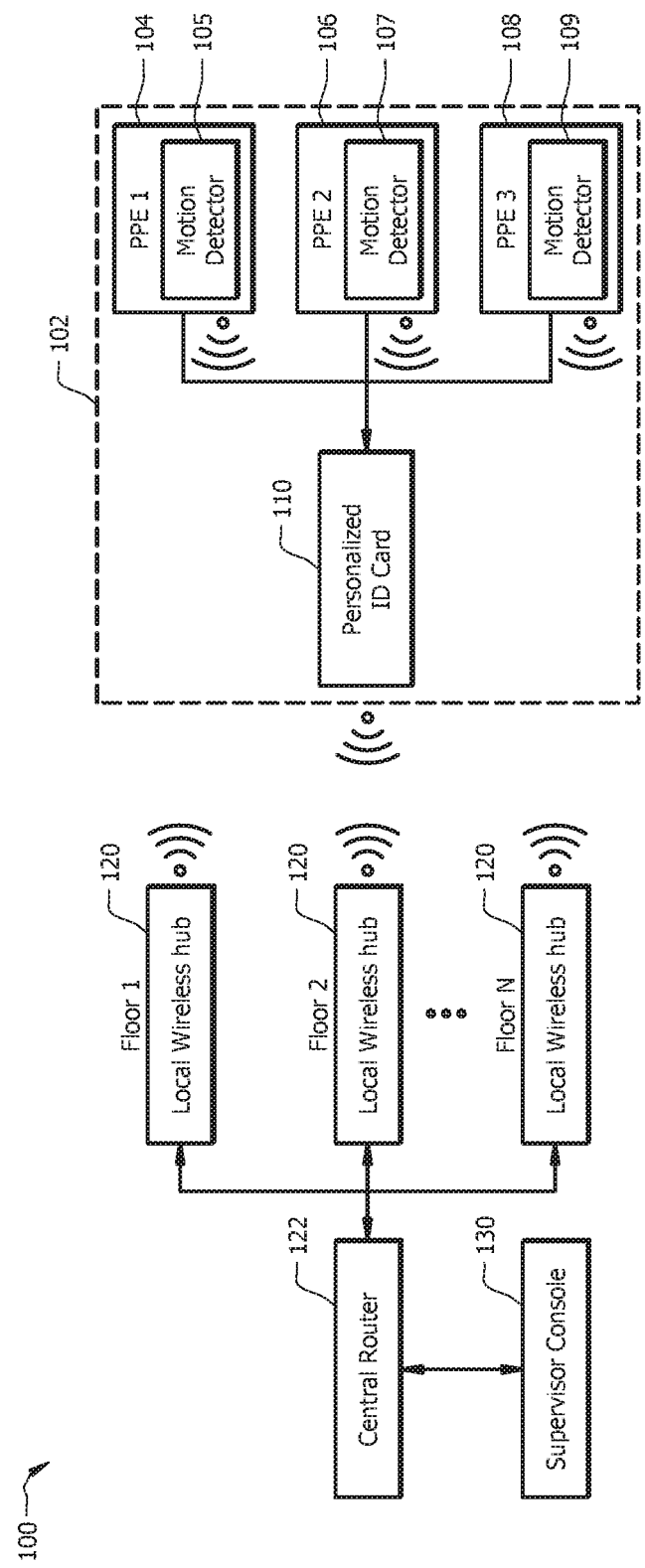
FIG. 1 illustrates a PPE compliance monitoring system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include methods and systems for monitoring PPE compliance. In any industry with potentially hazardous environments, compliance with PPE standards is necessary to save lives, prevent harm, meet regulations, and avoid costly insurance claims. Typically, solutions for determining compliance involve passive, complicated installation and maintenance systems, which may not provide real-time compliance information, for example to a supervisor. Current solutions may require that the supervisor visually oversee a workplace to ensure compliance.

Applicants propose a system for real-time PPE compliance monitoring that comprises the use of sensory detection to indicate if a PPE is worn or not. The sensory detection may comprise motion detection. Additionally, the system may provide information to a supervisor dynamically. Motion detectors may be attached to, or incorporated into, PPE devices, wherein the motion detectors may communicate wirelessly with a personal ID card worn by the user. Additionally, information from the motion detectors may be ultimately communicated to a supervisor console, and possibly stored for future reference. Existing PPE devices may be tagged with motion detectors, and therefore retrofitted into the system.

In some embodiments, the system may also be operable to find abnormal behavior and alert the supervisor of the abnormality. For example, if the PPE is a respirator, the acceptable levels of airflow in the respirator may be measured, and a device may trigger an alarm if the airflow is out of the expected range of air flow, signifying distress. In another example, if the PPE is a gas detector, when the gas level measurement is beyond an acceptable level, this may trigger a distress call to the supervisor signifying imminent danger. This may allow the supervisor to keep track of the heath of all the PPEs a single window and receive alerts for any anomalies.

Referring now to FIG. 1, a system 100 is shown, wherein the system 100 comprises a wireless communication network which may be implemented within a facility. The system 100 may comprise a central router 122, wherein wireless communication between the elements of the system 100 are facilitated and passed through the central router 122. In some embodiments, the system 100 may comprise one or more local wireless hubs 120, operable to communicate with devices in the facility that are within the range of the local wireless hub 120. In some embodiments, the local wireless hubs 120 may be spaced to allow for wireless communication throughout the facility, such as on different floors, and/or different areas of the facility. In some embodiments, the system 100 may comprise a user system 102, wherein the user system 102 comprises devices worn or carried by the user. The user system 102 may comprise a personalized ID card 110, wherein the ID card 110 comprises wireless communication capabilities, and comprises personal information for the user, such as name, ID number, etc. The user system 102 may also comprise one or more PPE devices 104, 106, 108, wherein each of the PPE devices may comprise a motion detector 105, 107, 109 attached to or incorporated into the PPE device. PPE devices may comprise ear muffs, hard hats, helmets, boots, goggles, gloves, suits, hoods, gas detectors, protective clothing, hearing protection, bibs, coveralls, safety vests, gas detectors, respiration systems, among other PPE devices.

The motion detectors 105, 107, 109 of the PPE devices 104, 106, 108 may indicate that the PPE device is in motion, and therefore that the PPE device is being worn by the user. The PPE devices 104, 106, and 108 may communicate this information to the ID card 110, wherein the ID card 110 may associate the information with a user identifier. Then, the information may be communicated via the local wireless hub(s) 120 and the central router 122 to a supervisor console 130, wherein the information may be processed and displayed by the supervisor console 130. A supervisor may use the information displayed by the supervisor console 130 to ensure that the user is meeting PPE compliance, i.e. that the required PPE devices 104, 106, 108 are being worn by the user, as indicated by the motion detectors 105, 107, 109 of the PPE devices.

Figure 2A:
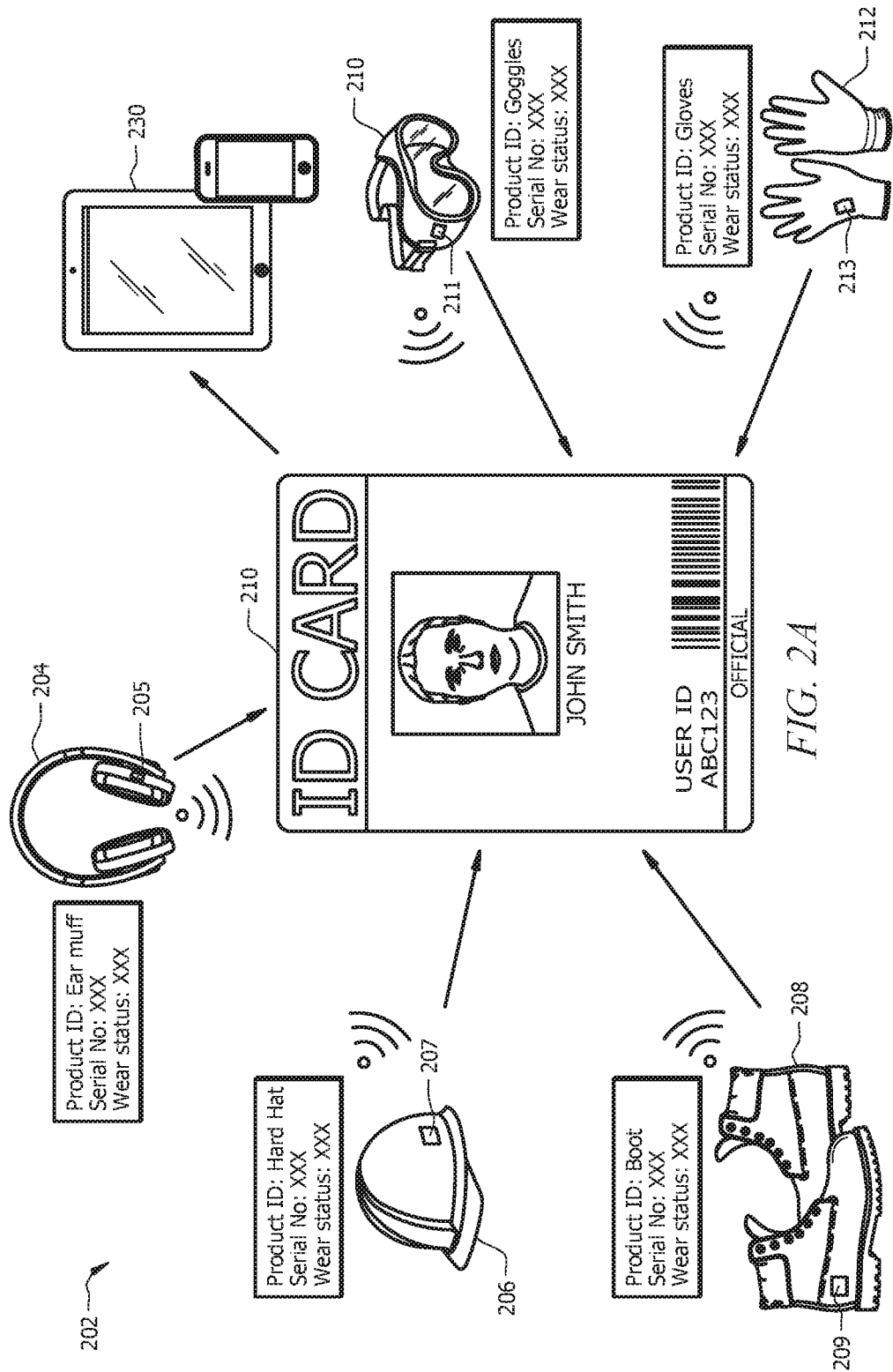
FIG. 2A illustrates a PPE compliance monitoring system according to an embodiment of the disclosure.

FIG. 2A illustrates an exemplary embodiment of a user system 202 in communication with a supervisor console 230. The supervisor console 230 may comprise a tablet, mobile device, computer, or other device operable to receive and display information to the supervisor. The supervisor console 230 may comprise wireless communication capabilities. The user system 202 comprise a personalized user ID card 210, which may be association with a specific user, and may comprise user information such as names, ID number, work area(s), job title, required PPE, etc. The user system 202 may also comprise a plurality of PPE devices, such as ear muffs 204, hard hat 206, boots 208, googles 210 and gloves 212. These are exemplary embodiments of PPE that may be worn by the user, but other PPE devices may also be included in the user system 202 such as helmets, suits, hoods, gas detectors, protective clothing, hearing protection, bibs, coveralls, safety vests, gas detectors, respiration systems, among other PPE devices. In some embodiments, a sensor module 205 may be attached to or incorporated into a PPE device 204, wherein each PPE device 204, 206, 208, 210, 212 may comprise a sensor module 205, 207, 209, 211, 213 attached to or incorporated into the PPE device.

In some embodiments, the user ID 210 may be enabled to receive wireless communication from each of the sensor modules that are attached to the PPE devices. In some embodiments, the sensor module 205 may comprise a motion sensor, wherein motion detected by the sensor module 205 may indicate that the PPE device 204 is in use. In other words, if a PPE device 204 is worn by the user, the user's normal motion would be detected by the sensor module 205 of the PPE device 204. The sensor module 205 may communicate motion information, which indicates use of the PPE device 204, to the user ID 210. In some embodiments, the user ID 210 may wirelessly communicate information to the supervisor console 230, and may associate the information with the specific user ID 210. In some embodiments, the user ID 210 may receive indications of use, determined by the motion information, from each of the PPE devices 204, 206, 208, 210, 212 that are within the range of the user ID 210.

In some embodiments, a user ID 210 may be associated with one or more required PPE devices that should be worn by the user, or are assigned to the user, based on the user's job and/or location. If a required PPE device does not communicate with the user ID 210, this information may be sent to the supervisor console 230, to indicate to the supervisor that the user is not in compliance with PPE requirements.

FIG. 2B illustrates an exemplary display for a supervisor console 230. In some embodiments, the supervisor console 230 may comprise a display showing information received from the user ID 210, such as a list of PPE devices in communication with the user ID 210 (shown in FIG. 2A), a list of assigned or required PPE devices, a list of users that are communicating information to the console, etc. The matrix of information shown by the display may alert the supervisor if a required PPE device is not worn by a user, so that steps may be taken to ensure that compliance is met by all users. Additionally, the supervisor console 230 may comprise visual and/or audible alerts for the supervisor if compliance is not met.

Figure 3:
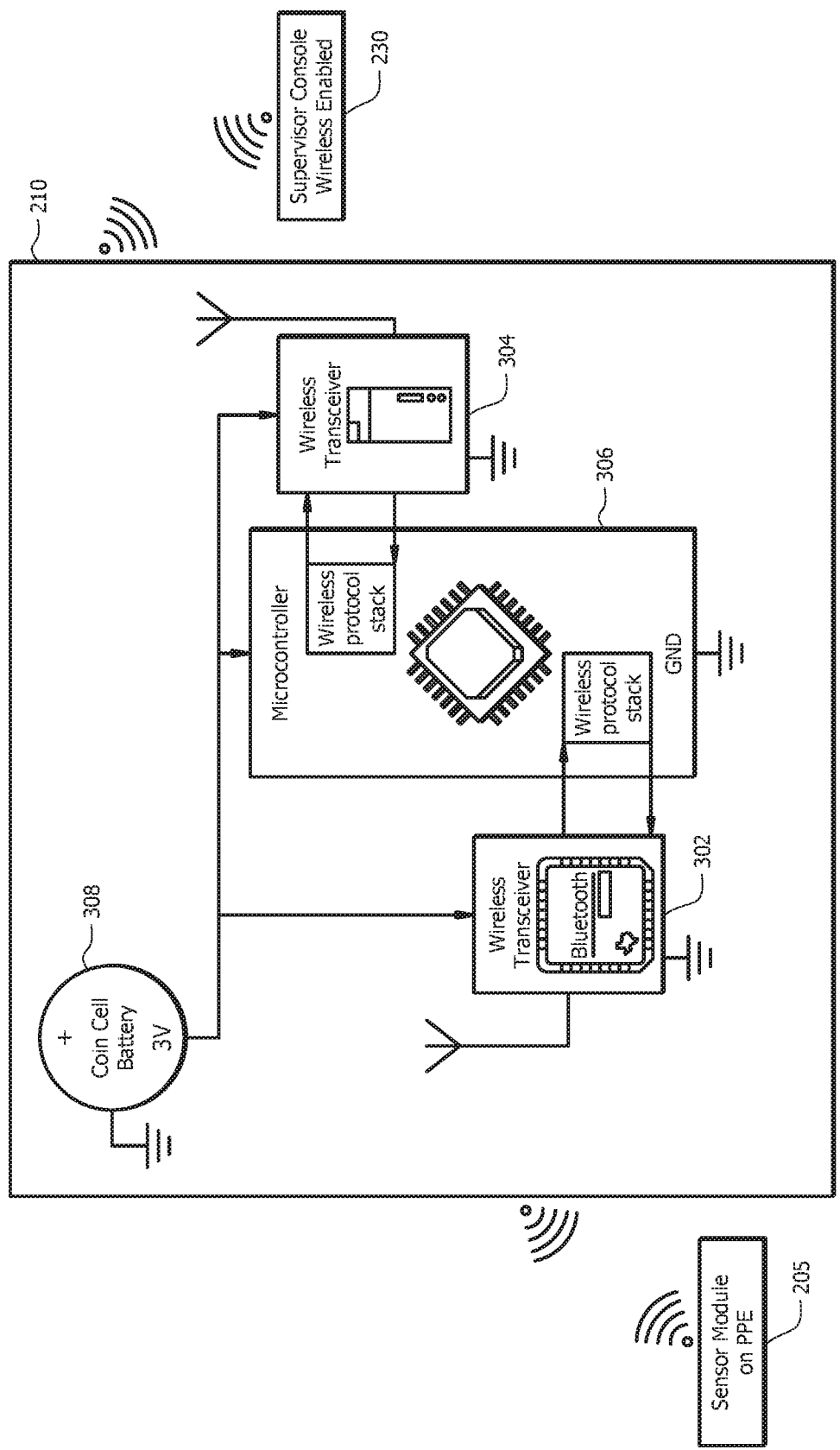
FIG. 3 illustrates a detailed view of a user ID module according to an embodiment of the disclosure.

FIG. 3 illustrates a detailed view of a user ID 210, as described in FIG. 2. The user ID 210 may comprise a wireless receiver 302, a wireless transceiver 304, a microcontroller 306 operable to communicate with the wireless receive 302 and transceiver 304, and a power source 308 (which may comprise a coin cell battery). In some embodiments, the wireless receiver 302 may comprise a Bluetooth receiver, wherein the wireless receiver 302 may be operable to receive information from one or more Bluetooth enabled PPE devices. For example, the wireless receiver 302 may communicate with a sensor module 205 attached to or incorporated into a PPE device (as described above). The microcontroller 306 of the user ID 210 may receive the information from the sensor module 205 and process that information. In some embodiments, the microcontroller 306 may associate the information with user identification information. In some embodiments, the microcontroller 306 may forward information to the wireless transceiver 304. The wireless transceiver 304 may communicate the information with a supervisor console 230, via a wireless network. As described above, the supervisor console 230 may display the information received from the user ID 210.

Figure 4:
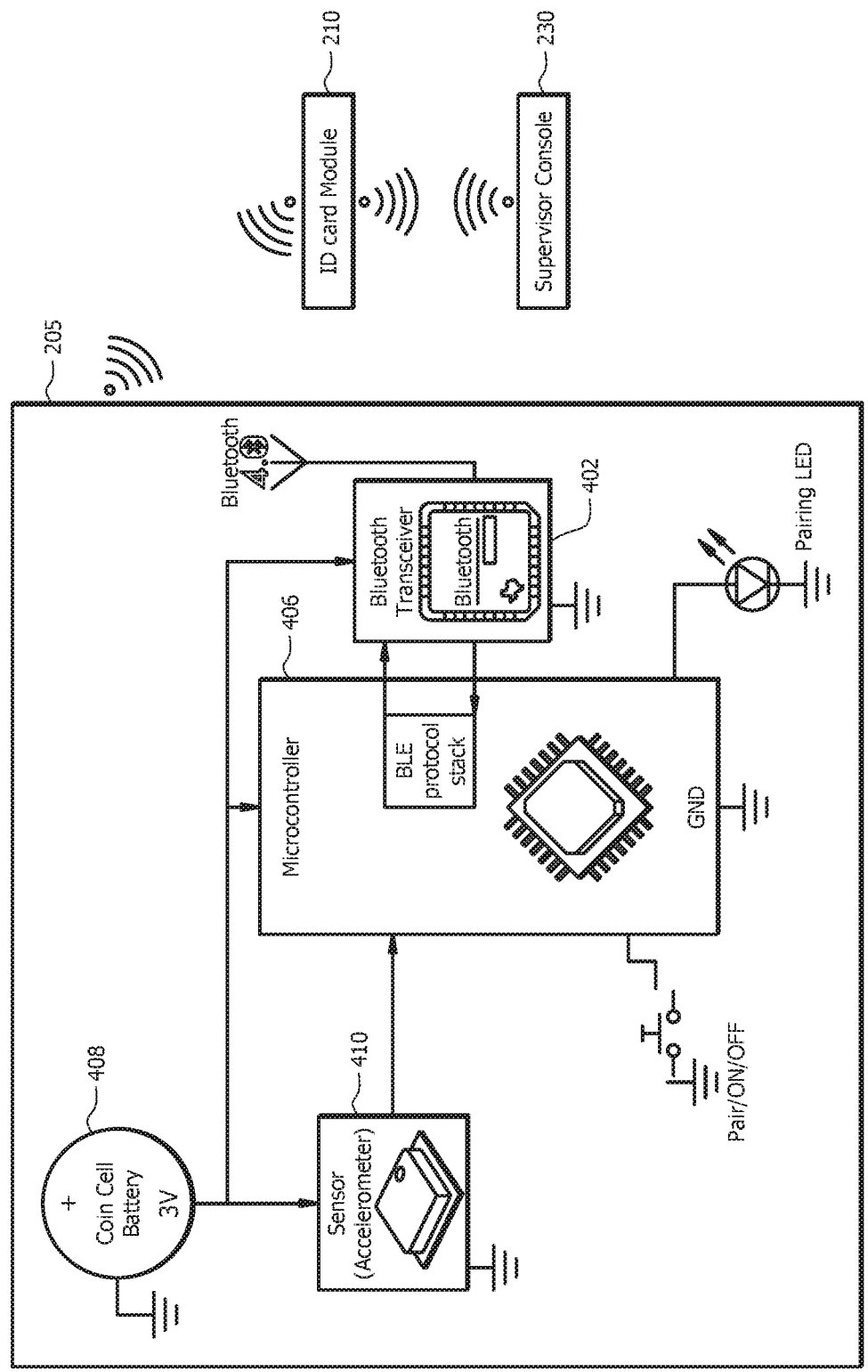
FIG. 4 illustrates a detailed view of a sensor module according to an embodiment of the disclosure.

FIG. 4 illustrates a detailed view of the sensor module 205 which may be attached to or incorporated into a PPE device (as described above). The sensor module 205 may comprise a motion sensor 410 (such as an accelerometer), a microcontroller 406, a wireless transceiver 402, and a power source 408 (which may comprise a coin cell battery). In some embodiments, the wireless transceiver 402 may comprise a Bluetooth transceiver, wherein the wireless transceiver 402 may communicate via Bluetooth with the user ID 210. The microcontroller 406 may receive information from the sensor 410 and may communicate that information via the wireless transceiver 402 to the user ID 210. The user ID 210 may further communicate the information to a supervisor console 230, wherein received motion detection may indicate that the PPE device associated with the sensor module 205 is being worn by a user.

In some embodiments, the sensor module 205 may be associated with a specific PPE device, and this information may be stored by the microcontroller 406. In some embodiments, the microcontroller may receive the motion data and associated with an identifier for the PPE device before sending the data to the user ID 210. Then, as described above, the user ID 210 may associate the data with a user identifier before forwarding the data to the supervisor console 230. Therefore, the information displayed by the supervisor console 230 may comprise the PPE identity, if motion was detected by the sensor module 205 associated with that PPE (thereby indicating that the PPE is worn), and the identity of the user wearing the PPE. "Pair" refers to a switch which can link two Bluetooth modules together.

Figure 5:
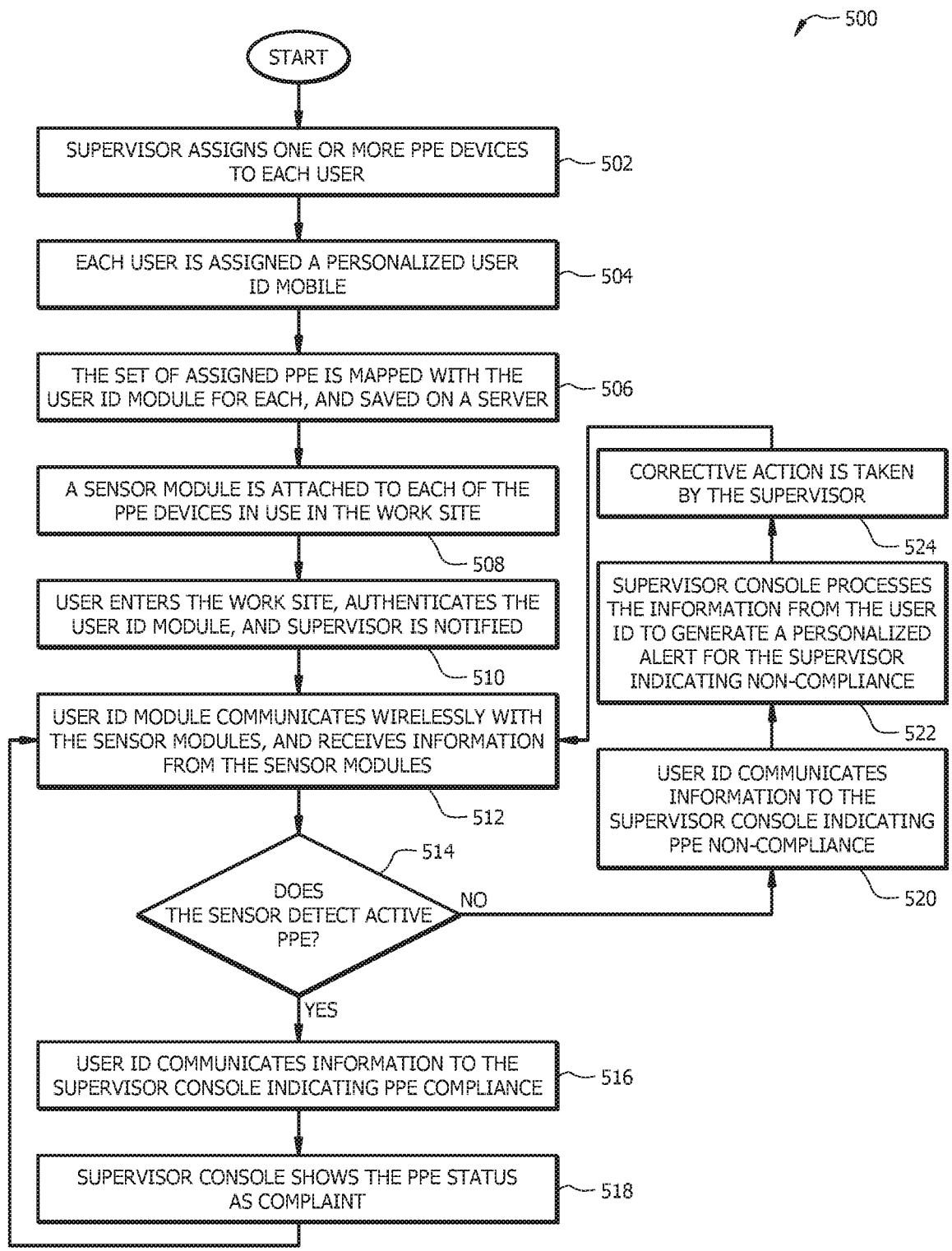
FIG. 5 illustrates a method for monitoring PPE compliance according to an embodiment of the disclosure.

FIG. 5 illustrates an exemplary embodiment of a method 500 for monitoring PPE compliance in a work site. At step 502, a supervisor may assign one or more PPE devices to each user (or worker) at a work site. The PPE devices may be assigned based on the type of work that a user may be doing, and the work environment the user will be in. At step 504, each user may be assigned a personalized user ID module. This may comprise a user ID card that is worn by the user at all times while they are in the work site. At step 506, the set of assigned PPE for each worker is mapped with the user ID module and saved to a server. In some embodiments, steps 502, 504, and 506 may be completed once for a new user that enters the work site. In some embodiments, steps 502, 504, and 506 may be completed every time a user moves to a new area of the workplace, to ensure that the assigned PPE devices are in compliance with the required PPE devices for each area of the workplace.

In some embodiments, at step 508, sensor modules may be attached to each of the assigned PPE devices. This step may be completed before the PPE devices are worn by a user. At step 510, the user may enter the work site, and may scan or swipe their user ID card to authenticate the user ID card. Additionally, the supervisor may be notified that the user has entered the worksite.

At step 512, the user ID for each user may communicate wirelessly with each sensor module that is attached to a PPE device worn by the user, wherein the user ID may receive information from the sensor modules. At step 514, it may be determined if a sensor module detects that the PPE devices is active. In some embodiments, detecting that the PPE device is active may comprise detecting motion by the sensor module. In some embodiments, step 514 may be completed for each of the sensor modules attached to each of the PPE devices for each of the user.

If it is determined that the PPE device is active, at step 516, the user ID may communicate information to the supervisor console indicating PPE compliance, for that particular PPE device. At step 518, the supervisor console may show the PPE status as compliant, and the method 500 may repeat from step 512 until the user leaves the worksite.

If it is determined that the PPE device is not active, at step 520, the user ID may communicate information to the supervisor console indicating PPE noncompliance, for that particular PPE device. At step 522, the supervisor console may process the information from the user ID to generate a personalized alert for the supervisor indicating noncompliance for that particular user and that particular PPE device. At step 524, a corrective action may be taken by the supervisor to ensure PPE compliance. Then, the method 500 may repeat from step 512 until the user leaves the work site.

In some embodiments, the steps 514-524 may be completed for each PPE devices worn by a user, wherein the supervisor console may display information for multiple PPE devices. Additionally, the method 500 may be completed for multiple users in a work site, wherein the supervisor console may display information for the multiple users.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically, and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Use of broader terms such as comprises, includes, and having should be understood to provide support for narrower terms such as consisting of, consisting essentially of, and comprised substantially of Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for monitoring use of a personal protection equipment, the system comprising:
    a supervisor console comprising a display operable to display user identifying information to a supervisor; and
    a user system worn or carried by a user, the user system comprising:
        (i) at least one sensor module attached to or incorporated into a personal protection equipment (PPE) device; and (ii) a user identification (ID) module configured to receive wear detection signals from the at least one sensor module, said wear detection signals indicative of whether the PPE device is being worn by the user, the user ID module comprising:
a processor;
a communication interface coupled to the processor and configured to receive the wear detection signals from the PPE device; and
a wireless interface coupled to the processor and configured to wirelessly transmit unique user identification information about the user to the supervisor console,
wherein the processor is operably configured to communicate, via the wireless interface, information indicating PPE non-compliance to the supervisor console in response to the wear detection signals received via the communication interface, and
wherein the supervisor console is further configured to generate an alert for the supervisor indicating non-compliance in response to receiving the information indicating PPE non-compliance.

2. The system of claim 1, wherein the display of the supervisor console shows information received from the user ID module.

3. The system of claim 1, wherein the information received from the user ID module comprises a list of PPE devices in communication with the user ID module.

4. The system of claim 1, wherein the information received from the user ID module comprises a list of users that are communicating information to the supervisor console.

5. The system of claim 1, wherein the information received from the user ID module comprises a list of PPE devices assigned to the user.

6. The system of claim 1, wherein the information received from the user ID module comprises a list of PPE devices required to be used by the user.

7. The system of claim 1, wherein the display of the supervisor console shows compliance alert information in response to receiving information from the user ID module to indicate that the user is not wearing a PPE device that is on a list of PPE devices required to be used by the user.

8. The system of claim 1, wherein the wear detection signals comprise motion signals.

9. The system of claim 1, wherein if the PPE device comprises a respirator, the wear detection signals comprise airflow signals.

10. The system of claim 1, wherein if the PPE device comprises a gas detector, the wear detection signals comprise a distress call triggerable in response to a gas level measurement being beyond a predetermined accepted level.

11. A system for monitoring use of a personal protection equipment, the system comprising:
a user system worn or carried by a user, the user system comprising:
(i) at least one sensor module attached to or incorporated into a personal protection equipment (PPE) device; and
(ii) a user identification (ID) module configured to receive wear detection signals from the at least one sensor module, said wear detection signals indicative of whether the PPE device is being worn by the user, the user ID module comprising:
a processor;
a communications interface coupled to the processor and configured to receive the wear detection signals from the PPE device; and
a wireless interface coupled to the processor and configured to wirelessly transmit unique user identification information about the user to a supervisor console,
wherein the processor is operably configured to communicate, via the wireless interface, information indicating PPE non-compliance to the supervisor console in response to the wear detection signals received via the communications interface.

12. The system of claim 11, wherein the information received from the user ID module comprises a list of PPE devices assigned to the user.

13. The system of claim 11, wherein the information received from the user ID module comprises a list of PPE devices required to be used by the user.

14. The system of claim 11, wherein the wear detection signals comprise motion signals.

15. The system of claim 11, wherein if the PPE device comprises a respirator, the wear detection signals comprise airflow signals.

16. The system of claim 11, wherein if the PPE device comprises a gas detector, the wear detection signals comprise a distress call triggerable in response to a gas level measurement being beyond a predetermined accepted level.

17. The system of claim 11, further comprising the supervisor console comprising a display operable to display user identifying information to a supervisor, wherein the supervisor console is further configured to generate an alert for the supervisor indicating non-compliance in response to receiving the information indicating PPE non-compliance.

18. The system of claim 17, wherein the information received from the user ID module comprises a list of PPE devices in communication with the user ID module.

19. The system of claim 17, wherein the information received from the user ID module comprises a list of users that are communicating information to the supervisor console.

20. The system of claim 17, wherein the display of the supervisor console shows compliance alert information in response to receiving information from the user ID module to indicate that the user is not wearing a PPE device that is on a list of PPE devices required to be used by the user.

* * * * *